US 008050266B2

(12) United States Patent
Tripathi et al.

(10) Patent No.: US 8,050,266 B2
(45) Date of Patent: Nov. 1, 2011

(54) LOW IMPACT NETWORK DEBUGGING

(75) Inventors: Sunay Tripathi, San Jose, CA (US); Bruce W. Curtis, San Ramon, CA (US); Hsiao-Keng Jerry Chu, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1503 days.

(21) Appl. No.: 11/489,926

(22) Filed: Jul. 20, 2006

(65) Prior Publication Data

US 2008/0043632 A1 Feb. 21, 2008

(51) Int. Cl.
*H04L 12/28* (2006.01)

(52) U.S. Cl. ......... 370/392; 370/406; 370/413; 370/424

(58) Field of Classification Search .................. 370/392, 370/412, 406, 413, 424, 395.42
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 7,356,818 B2 * | 4/2008 | Carollo et al. | 718/102 |
| 7,484,208 B1 * | 1/2009 | Nelson | 718/1 |
| 7,620,955 B1 * | 11/2009 | Nelson | 719/312 |
| 7,657,659 B1 * | 2/2010 | Lambeth et al. | 709/250 |
| 7,715,416 B2 * | 5/2010 | Srinivasan et al. | 370/412 |
| 2003/0037154 A1 | 2/2003 | Poggio et al. | |
| 2004/0003141 A1 * | 1/2004 | Matters et al. | 710/1 |
| 2004/0015966 A1 * | 1/2004 | MacChiano et al. | 718/1 |
| 2004/0267866 A1 | 12/2004 | Carollo et al. | |
| 2005/0076136 A1 * | 4/2005 | Cho et al. | 709/231 |
| 2005/0111455 A1 | 5/2005 | Nozue et al. | |
| 2005/0135243 A1 | 6/2005 | Lee et al. | |
| 2005/0138620 A1 | 6/2005 | Lewites | |

(Continued)

OTHER PUBLICATIONS

"Solaris Networking—The Magic Revealed (Part I)"; Sunay Tripathi's Solaris Networking Weblog; Nov. 14, 2005, pp. 1-22 (22 pages).

(Continued)

*Primary Examiner* — Ricky Ngo
*Assistant Examiner* — Dewanda Samuel
(74) *Attorney, Agent, or Firm* — Osha • Liang LLP

(57) ABSTRACT

A method for debugging network connections that involves receiving a packet for a first destination by a network interface card (NIC), classifying the packet, sending the packet to a first receive ring associated with the NIC, and sending the packet from the first receive ring to a first virtual NIC, where the first virtual NIC is associated with a second destination, and where the second destination is used to debug the first destination.

17 Claims, 3 Drawing Sheets

U.S. PATENT DOCUMENTS

| | | |
|---|---|---|
| 2005/0183093 A1* | 8/2005 | Pope et al. ............... 719/314 |
| 2005/0188070 A1* | 8/2005 | Tripathi et al. ........... 709/223 |
| 2006/0041667 A1 | 2/2006 | Ahn et al. |
| 2006/0045089 A1* | 3/2006 | Bacher et al. ............ 370/392 |
| 2006/0070066 A1* | 3/2006 | Grobman .................... 718/1 |
| 2006/0174324 A1 | 8/2006 | Zur et al. |
| 2006/0206300 A1* | 9/2006 | Garg et al. ................ 703/27 |

OTHER PUBLICATIONS

Dovrolis, C., Thayer, B. and Ramanthan, P.: "HIP Hybrid Interrupt—Polling for the Network Interface", ACM SIGOPS Operating Systems Review, vol. 35, Iss. 4, Oct. 2001, (11 Pages).

* cited by examiner

LOW IMPACT NETWORK DEBUGGING

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046 "Method and System for Controlling Virtual Machine Bandwidth" with U.S. application Ser. No. 11/480,000 "Virtual Switch" with U.S. application Ser. No. 12/827,973 "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No.11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143.

The present application contains subject matter that may be related to the subject matter in the following U.S. applications filed on Jul. 20, 2006, and assigned to the assignee of the present application: "Reflecting Bandwidth and Priority in Network Attached Storage I/O" with U.S. application Ser. No. 12/848,359 "Priority and Bandwidth Specification at Mount Time of NAS Device Volume" with U.S. application Ser. No. 12/489,934 "Notifying Network Applications of Receive Overflow Conditions" with U.S. application Ser. No. 11/490,821; "Host Operating System Bypass for Packets Destined for a Virtual Machine" with U.S. application Ser. No. 11/489,943; "Multi-Level Packet Classification" with U.S. application Ser. No. 11/490,745; "Method and System for Automatically Reflecting Hardware Resource Allocation Modifications" with U.S. application Ser. No. 11/490,582; "Multiple Virtual Network Stack Instances Using Virtual Network Interface Cards" with U.S. application Ser. No. 11/489,942; "Method and System for Network Configuration for Containers" with U.S. application Ser. No. 11/490,479; "Network Memory Pools for Packet Destinations and Virtual Machines" with U.S. application Ser. No. 11/490,486; "Method and System for Network Configuration for Virtual Machines" with U.S. application Ser. No.11/489,923; "Multiple Virtual Network Stack Instances" with U.S. application Ser. No. 11/489,929; and "Shared and Separate Network Stack Instances" with U.S. application Ser. No. 11/489,933.

BACKGROUND

Network traffic is transmitted over a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are forwarded to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for debugging network connections. The method comprises receiving a packet for a first destination by a network interface card (NIC), classifying the packet, sending the packet to a first receive ring associated with the NIC, and sending the packet from the first receive ring to a first virtual NIC, wherein the first virtual NIC is associated with a second destination, and wherein the second destination is used to debug the first destination.

In general, in one aspect, the invention relates to a system. The system comprises a host. The host comprises a first destination, a second destination, wherein the second destination is used to debug the first destination, a first virtual NIC associated with the second destination, and a network interface card (NIC), operatively connected to the host, comprising a first receive ring, wherein the NIC is configured to: receive a packet for the first destination, classify the packet, send the packet to the first receive ring, and send the packet from the first receive ring to the first virtual NIC.

In general, in one aspect, the invention relates to a computer usable medium having computer readable program code embodied therein for causing a computer system to execute a method for debugging network connections. The method comprises receiving a packet for a first destination by a network interface card (NIC), classifying the packet, sending the packet to a first receive ring associated with the NIC, and sending the packet from the first receive ring to a first virtual NIC, wherein the first virtual NIC is associated with a second destination, and wherein the second destination is used to debug the first destination.

Other aspects of the invention will be apparent from the following description and the appended claims.

DETAILED DESCRIPTION

Figure 1:
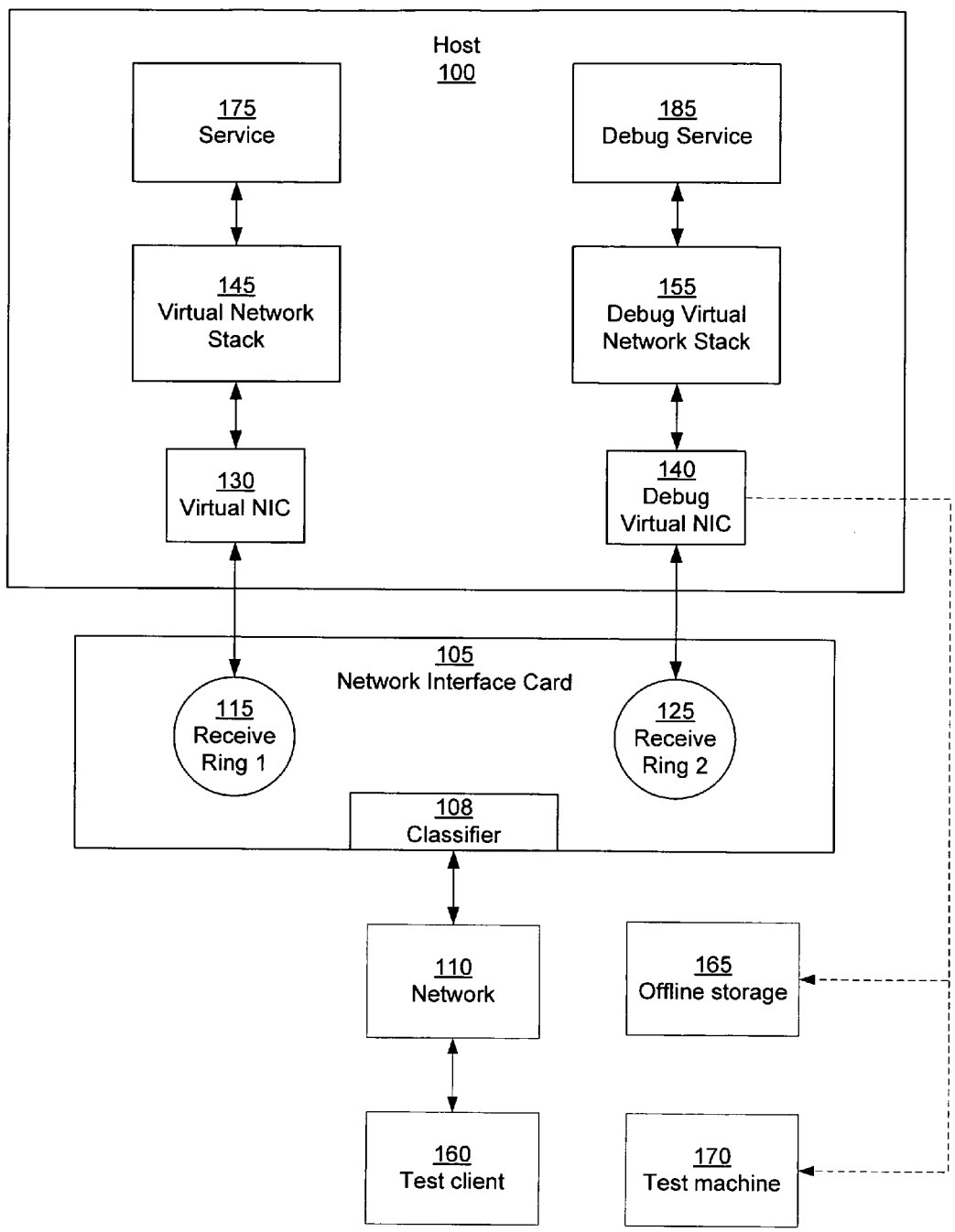
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to debug network connections. A network connection involves the transport of packets between a source and a destination. When packets between the source and destination are dropped, missing, misdirected, or arrive out of order, the connection between the source and destination is examined at various levels (e.g., transport layer, network layer, etc.) in order to determine where errors are occurring.

Embodiments of the invention provide a method and apparatus to debug network connections at high bandwidth sites while incurring minimal computational cost. In one embodiment of the invention, packets from a problematic connection are isolated by a network interface card (NIC) and redirected to a virtual NIC, where the packets may be further redirected to a test machine, offline storage, or a processor for real-time processing. Each packet may also be copied and the copy sent to the original packet destination so that the original connection may be observed for anomalies. In addition, embodiments of the invention allow the connection state to be captured and stored once a packet is transmitted or received by the NIC to further aid in determining the condition of the network connection.

FIG. 1 shows a schematic diagram of a system in accordance with one or more embodiments of the invention. As shown in FIG. 1, the system includes a host (100), a NIC (105), a virtual NIC (130), a debug virtual NIC (140), a virtual network stack (145), a debug virtual network stack (155), a service (175), a debug service (185), a network (110), a test client (160), an offline storage (165), and a test machine (170). Each of these components is described below.

The NIC (105) provides an interface between the host (100) and the network (110) (e.g., a local area network, a wide area network, a wireless network, etc.). More specifically, the NIC (105) includes a network interface (NI) (i.e., the hardware on the NIC used to interface with the network (110)). For example, the NI may correspond to an RJ-45 connector, a wireless antenna, etc. The packets received by the NI are then forwarded to other components on the NIC (105) for processing. In one embodiment of the invention, the NIC (105) includes one or more receive rings (e.g., receive ring 1 (115), receive ring 2 (125)). In one embodiment of the invention, the receive rings (e.g., receive ring 1 (115), receive ring 2 (125)) correspond to portions of memory within the NIC (105) used to temporarily store packets received from the network (110). In one or more embodiments of the invention, the receive rings (e.g., receive ring 1 (115), receive ring 2 (125)) are implemented as ring buffers in the NIC (105). In one embodiment of the invention, the classifier (108) is configured to analyze the incoming network traffic, typically in the form of packets, received from the network (110).

In one embodiment of the invention, analyzing individual packets includes determining to which of the receive rings (e.g., receive ring 1 (115), receive ring 2 (125)) each packet is sent. In one embodiment of the invention, analyzing the packets by the classifier (108) includes analyzing one or more fields in each of the packets to determine to which of the receive rings (e.g., receive ring 1 (115), receive ring 2 (125))

the packets are sent. As an alternative, the classifier (108) may use the contents of one or more fields in each packet as an index into a data structure that includes information necessary to determine to which receive ring (e.g., receive ring 1 (115), receive ring 2 (125)) that packet is sent. The classifier (108) may be implemented entirely in hardware (i.e., the classifier (108) may be a separate microprocessor embedded on the NIC (105)), or the classifier (108) may be implemented in software stored in memory (e.g., firmware, etc.) on the NIC and executed by a microprocessor on the NIC (105).

In one or more embodiments of the invention, the host (100) may include a device driver (not shown) and one or more virtual NICs (e.g., virtual NIC (130), debug virtual NIC (140)). In one embodiment of the invention, the device driver provides an interface between the receive rings (e.g., receive ring 1 (115), receive ring 2 (125)) and the host (100). More specifically, the device driver (not shown) exposes the receive rings (e.g., receive ring 1 (115), receive ring 2 (125)) to the host (100). In one embodiment of the invention, each of the virtual NICs (e.g., virtual NIC (130), debug virtual NIC (140)) is associated with one or more receive rings (e.g., receive ring 1 (115), receive ring 2 (125)). In other words, a virtual NIC (e.g., virtual NIC (130), debug virtual NIC (140)) receives incoming packets from the corresponding receive ring (e.g., receive ring 1 (115), receive ring 2 (125)).

In one or more embodiments of the invention, the virtual NICs (e.g., virtual NIC (130), debug virtual NIC (140)) are operatively connected to services (e.g., service (175), debug service (185)) via virtual network stacks (e.g., virtual network stack (145), debug virtual network stack (155)). The virtual NICs (e.g., virtual NIC (130), debug virtual NIC (140)) provide an abstraction layer between the NIC (105) and the services (e.g., service (175), debug service (185)) on the host (100). More specifically, each virtual NIC (e.g., virtual NIC (130), debug virtual NIC (140)) operates like a NIC (105). For example, in one embodiment of the invention, each virtual NIC (e.g., virtual NIC (130), debug virtual NIC (140)) is associated with one or more Internet Protocol (IP) addresses, one or more ports, and is configured to handle one or more protocol types. Thus, while the host (100) may be operatively connected to a single NIC (105), services (e.g., service (175), debug service (185)) executing on the host (100) operate as if the host (100) is bound to multiple NICs. To each service (e.g., service (175), debug service (185)), the corresponding virtual NIC (e.g., virtual NIC (130), debug virtual NIC (140)) is indistinguishable from a physical NIC (105). Further, each virtual NIC (e.g., virtual NIC (130), debug virtual NIC (140)) includes properties of a physical NIC, such as link speed, Media Access Control (MAC) address, etc. Those skilled in the art will appreciate that an arbitrary number of virtual NICs (e.g., virtual NIC (130), debug virtual NIC (140)) may be created for a given physical NIC (105), subject to resource limitations.

In one embodiment of the invention, each virtual network stack (e.g., virtual network stack (145), debug virtual network stack (155)) includes functionality to process packets in accordance with various protocols used to send and receive packets (e.g., Transmission Communication Protocol (TCP), Internet Protocol (IP), User Datagram Protocol (UDP), etc.). Further, each virtual network stack (e.g., virtual network stack (145), debug virtual network stack (155)) may also include functionality, as needed, to perform additional processing on the incoming and outgoing packets. This additional processing may include, but is not limited to, cryptographic processing, firewall routing, debugging, rerouting, etc.

In one or more embodiments of the invention, the virtual network stacks (e.g., virtual network stack (145), debug virtual network stack (155)) correspond to network stacks with network layer and transport layer functionality. In one embodiment of the invention, network layer functionality corresponds to functionality to manage packet addressing and delivery on a network (e.g., functionality to support Internet Protocol, Address Resolution Protocol (ARP), Internet Control Message Protocol (ICMP), etc.). In one embodiment of the invention, transport layer functionality corresponds to functionality to manage the transfer of packets on the network (e.g., functionality to support TCP, UDP, Stream Control Transmission Protocol (SCTP), etc.).

In one or more embodiments of the invention, the system of FIG. 1 is used to debug a network connection between a client and a service (175). A test client (160) is configured to send packets to the service (175) over the network (110). In one or more embodiments of the invention, the test client (160) corresponds to a system with an IP address that is recognized by the classifier (108). Those skilled in the art will appreciate that the test client (160) does not have to be a physical system; the test client (160) may be run on a virtual machine or container, which may or may not reside on the host (100). In one or more embodiments of the invention, packets sent from the test client (160) are identified by the classifier (108) using fields for the source address and destination address in the packet header. For example, if the test client (160) has an IP address of 10.1.10.5 and the virtual NIC (130) has an IP address of 192.14.28.15, packets with a source address of 10.1.10.5 and a destination address of 192.14.28.15 are identified by the classifier as part of the debugging system.

In one or more embodiments of the invention, a debug virtual NIC (140), debug virtual network stack (155), and debug service (185) are set up to isolate packets originating from the test client (160) from packets originating from other sources. For example, the debug virtual NIC (140), debug virtual network stack (155), and debug service (185) are used to examine a network connection that sends packets to the service (175) by receiving and redirecting packets originating from the test client (160) without interfering with or accessing packets sent from other sources, such as real client machines communicating with the host (100). While debugging takes place, the service (175) is allowed to receive and process packets from other sources, as well as transmit packets to other clients (not shown). Those skilled in the art will appreciate that the system of FIG. 1 may be used to transmit packets to the test client (160) as well as receive packets from the test client (160). In addition, those skilled in the art will appreciate that multiple test clients (160) and multiple debug virtual NICs (140), debug virtual network stacks (155), and debug services (185) may be set up on the same host (100) to examine multiple connections.

In one or more embodiments of the invention, the debug virtual network stack (155) and debug service (185) are duplicates of the virtual network stack (145) and service (175), respectively. Packets sent from the test client (160) are received by the NIC (105) and classified by the classifier (108), which places the packets in the receive ring (e.g., receive ring 2 (125)) corresponding to the debug virtual NIC (140). The debug virtual NIC (140) may then send the packets to the debug virtual network stack (155). Errors in the virtual network stack (145) may be observed when the packets proceed through the debug virtual network stack (155). In addition, errors in the service (175) may be observed once the packets arrive at the debug service (185) after going through the debug virtual network stack (155).

Alternatively, packets that arrive at the debug virtual NIC (140) from the test client (160) may be sent to offline storage (165) or a test machine (170) for further processing. The host (100) may be directly connected to the offline storage (165) or test machine (170), or the debug virtual NIC (140) may send the packets to the offline storage (165) or test machine (170) through a network (110). In addition, packets that arrive at the debug virtual NIC (140) from the test client (160) may be processed in real-time by a processor (not shown) operatively connected to the debug virtual NIC (140).

In one or more embodiments of the invention, packets from the test client (160) arrive at the NIC (105), or are sent from the NIC (105) to the test client (160). Once the packets arrive or leave, the connection state between the test client (160) and the host (100) is stored. In one or more embodiments of the invention, the connection state corresponds to a TCP connection state. For example, the connection state between the test client (160) and the host (100) may be LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, or CLOSED. Storing the connection state at the transmission or receipt of a packet allows more information about the connection to be known, and as a result, easier identification of problems occurring within the connection.

In addition, a packet sent from the test client (160) may be copied once the packet arrives at the NIC (105). The original packet is placed in receive ring 2 (125) and sent to the debug virtual NIC (140) as described above, and the copy of the packet is placed in receive ring 1 (115) and sent to the virtual NIC (130). Those skilled in the art will appreciate that the original packet and the copy of the packet are identical; either the original packet or the copy may be sent to either receive ring (e.g., receive ring 1 (115), receive ring 2 (125)) with the same result in both scenarios. As the packet, or the copy of the packet, travels between the virtual NIC (130) and the service (175), problems occurring at the virtual network stack (145) and service (175) may be identified; the debug virtual network stack (155) and debug service (185) may not be implemented to save overhead. In such cases, the debug virtual NIC (140) may be used to send the packet, or a copy of the packet, as well as a snapshot of the connection state upon receipt of the packet, to a test machine (170), offline storage (165), or a processor (not shown) for storage and/or further processing.

Figure 2:
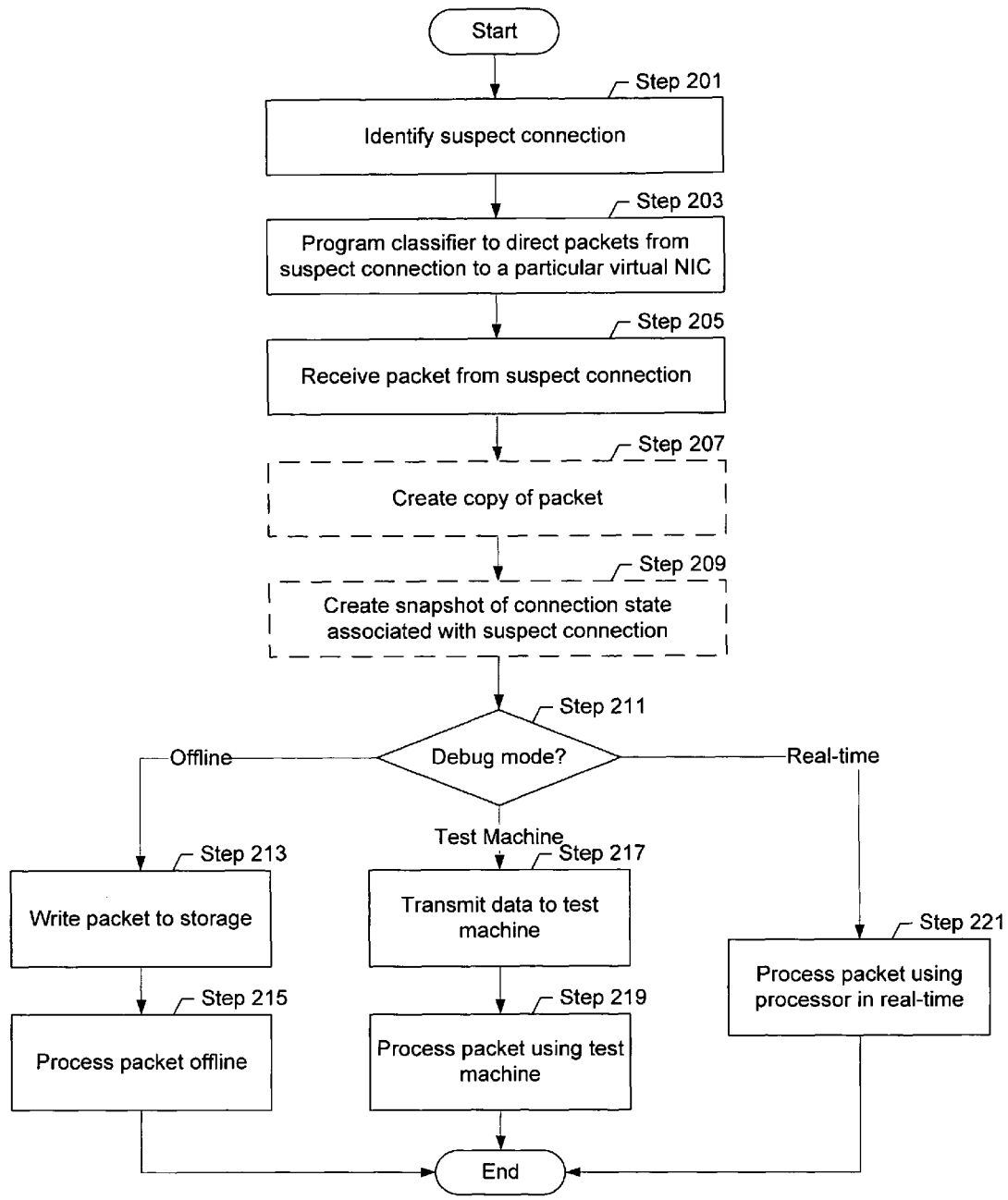
FIG. 2 shows a flow diagram in accordance with one or more embodiments of the invention.

FIG. 2 shows a flow diagram in accordance with one or more embodiments of the invention. First, a suspect connection is identified (Step 201). A suspect connection corresponds to a network connection with possible issues from, for example, the transmission of packets over the network infrastructure (e.g., routers, CAT-5 cable, etc.), the virtual network stack, the service, or socket. Next, the classifier is programmed to direct packets from the suspect connection to a particular virtual NIC (Step 203). In one or more embodiments of the invention, the virtual NIC corresponds to the debug virtual NIC of FIG. 1. As stated above, a test client may be set up to transmit packets along the suspect connection. As a result, only packets from that test client may be directed to the debug virtual NIC, while packets from other clients may be directed to the original packet destination.

Once the classifier has been programmed to direct packets from the suspect connection to the virtual NIC, a packet from the suspect connection is sent by the test client and received by the classifier (Step 205). The classifier then forwards the packet to the debug virtual NIC; the classifier may also optionally create a copy of the packet (Step 207) and forward the copy to the virtual NIC corresponding to the original packet destination. In addition, a snapshot of the connection state associated with the suspect connection (Step 209) is optionally taken once the packet is received by the classifier.

Once the packet arrives at the debug virtual NIC, the packet is further processed based on the debug mode of the debug virtual NIC (Step 211). If the debug mode is offline, the packet is written to offline storage (Step 213) and processed offline (Step 215) so that processing does not interfere with the flow of traffic through the NIC. Alternatively, if the debug mode is test machine, the packet is transmitted to a test machine (Step 217), where the packet is processed (Step 219) so as to not interfere with activity on the host. As stated above, the packet may be sent to offline storage or the test machine through a direct connection with the storage or test machine, or through the network. If the debug mode is real-time, a processor is used to process the packet in real-time (Step 221). The processor may be a Central Processing Unit (CPU) operatively connected to the debug virtual NIC, or the processor may be located elsewhere, such as on the NIC. In one or more embodiments of the invention, multiple debug modes take place once the packet is received by the debug virtual NIC. For example, the packet may be sent to a test machine as well as processed in real-time, or the packet may be processed using all three debug modes.

The following is an example covering one or more embodiments of the invention. The example is not intended to limit the scope of the invention. Assume that an network error is detected by the service (175 in FIG. 1). However, it is not clear what the source of the network error. In accordance with one or more embodiments of the invention, a test machine is configured to send packets to the suspect connection (i.e., VNIC (130 in FIG. 1), virtual network stack (145 in FIG. 1) and the service (175 in FIG. 1)).

Prior to sending the packets from the test machine, the classifier (108 in FIG. 1) in the NIC (105 in FIG. 1) is configured to identify packets from the test machine (based on, for example, source IP address) and send the packets to the first receive ring (115 in FIG. 1) and a copy of the packet to the second receive ring (125 in FIG. 1). In addition, prior to sending the packets from the test machine, a debug virtual NIC (140 in FIG. 1), a debug virtual network stack (155 in FIG. 1) and a debug service (185 in FIG. 1) are also created.

Packets from the test machine are subsequently sent to the NIC (105 in FIG. 1). The packets sent from the test machine are for the service (175 in FIG. 1) (i.e., the destination IP address in the packet corresponds to the IP address of the service). The NIC (105 in FIG. 1), upon receiving the packets, sends the packet to the first receive ring (115 in FIG. 1) and a copy of the packet to the second receive ring (125 in FIG. 1).

At this stage, the progress of the packet through the suspect connection may be monitored. In addition, the progress of the copy of the packet may also be monitored as it progresses through the debug virtual NIC (140 in FIG. 1), the debug virtual network stack (155 in FIG. 1) and the debug service (185 in FIG. 1). In one embodiment of the invention, a user may have root access to the debug virtual NIC (140 in FIG. 1), the debug virtual network stack (155 in FIG. 1) and the debug service (185 in FIG. 1) and, accordingly, may perform more in-depth analysis of progress of the copy of the packet as it progresses through the debug virtual NIC (140 in FIG. 1), the debug virtual network stack (155 in FIG. 1) and the debug service (185 in FIG. 1).

In one embodiment of the invention, the debug service (185 in FIG. 1) may be useful in cases where root access to the service (175 in FIG. 1) has not been granted. Further, by issuing packets from a test machine and analyzing the progress of the packets through the suspect connection, the user may be able to debug the suspect connection without viewing packets associated with other clients of the service.

Figure 3:
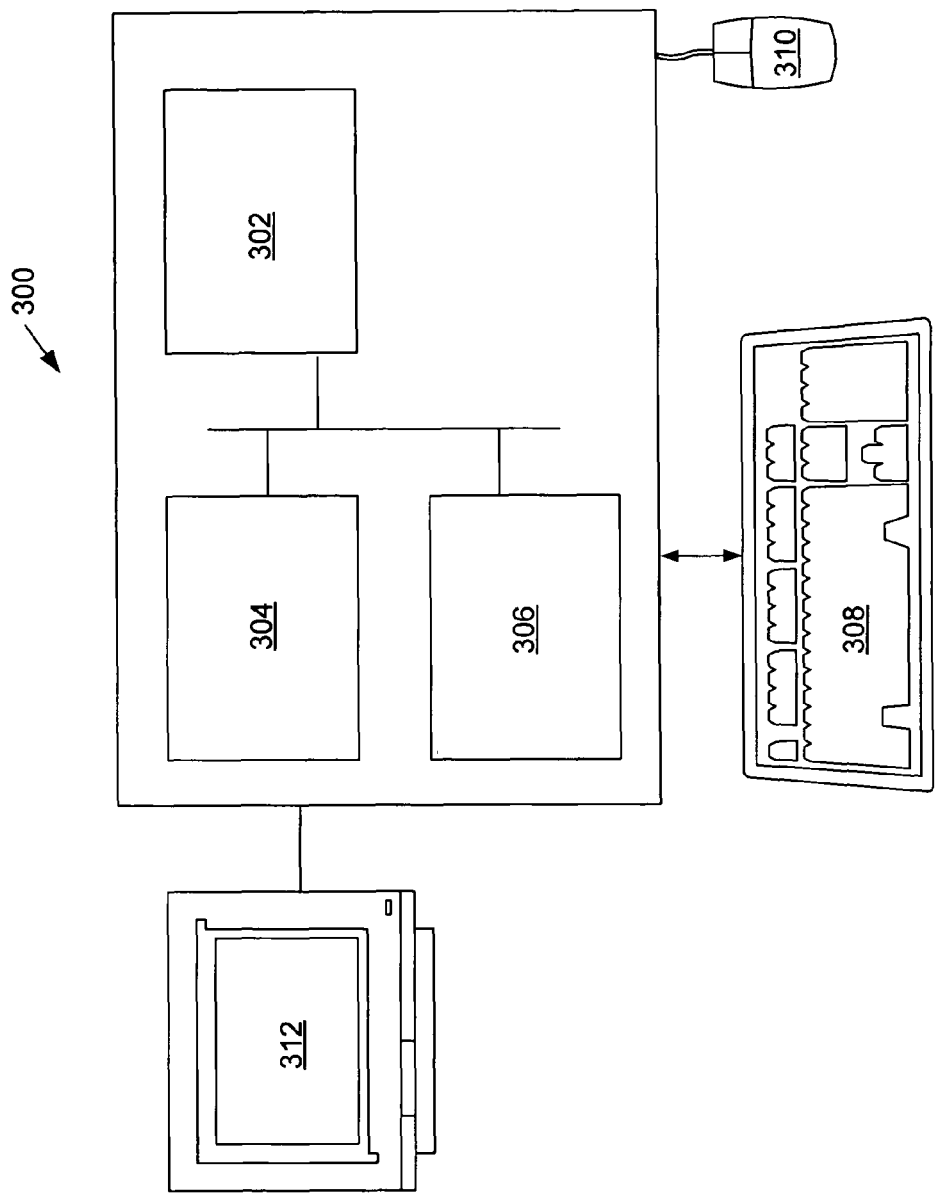
FIG. 3 shows a computer system in accordance with one or more embodiments of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., test machine, test client, network interface card, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for debugging network connections, comprising:
   receiving a packet for a first destination by a network interface card (NIC);
   classifying the packet;
   sending, based on the classifying, the packet to a first receive ring associated with the NIC; and
   sending the packet from the first receive ring to a first virtual NIC,
   wherein the first virtual NIC is associated with a second destination, and
   wherein the second destination comprises a debugging service, which when executed, is configured to debug the first destination.

2. The method of claim 1, further comprising:
   creating a copy of the packet after classification;
   sending the copy of the packet to a second receive ring associated with the NIC; and
   sending the copy of the packet from the second receive ring to a second virtual NIC, wherein the second virtual NIC is associated with the first destination.

3. The method of claim 1, further comprising:
   recording a Transmission Control Protocol (TCP) connection state associated with the packet when the packet is received.

4. The method of claim 1, further comprising:
   sending the packet from the first virtual NIC to a debug virtual network stack, wherein the debug virtual network stack is associated with the second destination.

5. A system, comprising:
   a host, comprising:
      a first destination;
      a second destination, wherein the second destination comprises a debugging service, which when executed, is configured to debug the first destination;
      a first virtual NIC associated with the second destination; and
   a network interface card (NIC), operatively connected to the host, comprising a first receive ring,
   wherein the NIC is configured to:
      receive a first packet for the first destination;
      classify the first packet;
      send, based on the classifying, the first packet to the first receive ring; and
      send the first packet from the first receive ring to the first virtual NIC.

6. The system of claim 5, wherein the NIC further comprises a second receive ring, wherein the host further comprises a second virtual NIC, and wherein the NIC is further configured to:
   create a copy of the first packet after classification;
   send the copy of the first packet to the second receive ring; and
   send the copy of the first packet from the second receive ring to the second virtual NIC,
   wherein the second virtual NIC is associated with the first destination.

7. The system of claim 5, further comprising:
   an offline storage,
   wherein the host is further configured to:
      receive a second packet;
      classify the second packet;
      send, based on the classifying, the second packet to the first receive ring; and
      write the second packet from the first virtual NIC to the offline storage.

8. The system of claim 5, further comprising:
   a test machine,
   wherein the host is further configured to:
      receive a second packet;
      classify the second packet;
      send, based on the classifying, the second packet to the first receive ring; and
      pass the second packet from the first virtual NIC to the test machine.

9. The system of claim 5, wherein the host further comprises:
   a processor, wherein the host is further configured to process the first packet from the virtual NIC using the processor in real-time.

10. The system of claim 5, wherein the host is further configured to:
    record a Transmission Control Protocol (TCP) connection state associated with the first packet when the first packet is received.

11. The system of claim 5, wherein the host is further configured to:
    pass the first packet from the virtual NIC to a debug virtual network stack, wherein the debug virtual network stack is associated with the second destination.

12. A non-transitory computer usable medium having computer readable program code embodied therein for causing a computer system to execute a method for debugging network connections, the method comprising:

receiving a first packet for a first destination by a network interface card (NIC);

classifying the first packet;

sending, based on the classifying, the first packet to a first receive ring associated with the NIC; and sending the first packet from the first receive ring to a first virtual NIC, wherein the first virtual NIC is associated with a second destination, and wherein the second destination comprises a debugging service, which when executed, is configured to debug the first destination.

13. The non-transitory computer usable medium of claim 12, the method further comprising:

creating a copy of the first packet after classification;

sending the copy of the first packet to a second receive ring associated with the NIC; and sending the copy of the first packet from the second receive ring to a second virtual NIC, wherein the second virtual NIC is associated with the first destination.

14. The non-transitory computer usable medium of claim 12, the method further comprising:

recording a Transmission Control Protocol (TCP) connection state associated with the first packet when the packet is received.

15. The non-transitory computer usable medium of claim 12, the method further comprising:

receiving a second packet for the first destination by the NIC;

classifying the second packet;

sending, based on the classifying, the second packet to the first receive ring associated with the NIC; and writing the second packet from the first virtual NIC to an offline storage.

16. The non-transitory computer usable medium of claim 12, the method further comprising:

receiving a second packet for the first destination by the NIC;

classifying the second packet;

sending, based on the classifying, the second packet to the first receive ring associated with the NIC; and sending the second packet from the first virtual NIC to a test machine.

17. The non-transitory computer usable medium of claim 12, the method further comprising:

processing the packet from the first virtual NIC using a processor in real-time.

* * * * *